(12) United States Patent
Takeyama et al.

(10) Patent No.: US 11,074,815 B2
(45) Date of Patent: Jul. 27, 2021

(54) DETERMINATION DEVICE, DETERMINATION METHOD, AND NON-TRANSITORY COMPUTER READABLE STORAGE MEDIUM STORING DETERMINING PROGRAM

(71) Applicants: Toyota Jidosha Kabushiki Kaisha, Toyota (JP); Aisin AW Co., Ltd., Anjo (JP)

(72) Inventors: Hiroaki Takeyama, Nisshin (JP); Motohiro Nakamura, Okazaki (JP); Norihiro Nakamura, Toyokawa (JP); Hideki Kasezawa, Okazaki (JP); Kensuke Takeuchi, Okazaki (JP); Hajime Morikawa, Nagoya (JP); Yoko Sakurai, Toyohashi (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 120 days.

(21) Appl. No.: 16/245,876

(22) Filed: Jan. 11, 2019

(65) Prior Publication Data
US 2019/0221124 A1 Jul. 18, 2019

(30) Foreign Application Priority Data
Jan. 12, 2018 (JP) .............................. JP2018-003594

(51) Int. Cl.
*G08G 1/14* (2006.01)
*B60W 40/09* (2012.01)
*G10L 15/22* (2006.01)

(52) U.S. Cl.
CPC ............. *G08G 1/143* (2013.01); *B60W 40/09* (2013.01); *G10L 15/22* (2013.01);
(Continued)

(58) Field of Classification Search
CPC ......... G08G 1/143; G08G 1/14; B60W 40/09; G10L 15/22
See application file for complete search history.

(56) References Cited

U.S. PATENT DOCUMENTS

| 2015/0123818 A1* | 5/2015 | Sellschopp | G08G 1/096816 340/932.2 |
| 2015/0379873 A1* | 12/2015 | Tippelhofer | G08G 1/143 340/932.2 |
| 2016/0055749 A1* | 2/2016 | Nicoll | G08G 1/096811 340/932.2 |

FOREIGN PATENT DOCUMENTS

| CN | 105225519 A | 1/2016 |
| JP | 2015184820 A | 10/2015 |

* cited by examiner

*Primary Examiner* — Aaron L Troost
(74) *Attorney, Agent, or Firm* — Dinsmore & Shohl LLP (57) ABSTRACT

A determination device determines a tendency of a driver who selects a parking space and includes an acquisition unit and a determination unit. The acquisition unit is configured to acquire information regarding an attribute of the parking space in a parking lot, information regarding behavior of a vehicle driven by the driver in the parking lot, and information regarding behavior of the driver when the driver is driving the vehicle in the parking lot. The determination unit is configured to determine the tendency of the driver when the driver selects the parking space, based on the information regarding the behavior of the vehicle or the information regarding the behavior of the driver and the information regarding the attribute of the parking space.

7 Claims, 5 Drawing Sheets

(52) U.S. Cl.
CPC ..... *B60W 2540/21* (2020.02); *B60W 2540/30* (2013.01); *G08G 1/14* (2013.01)

| TENDENCY OF DRIVER WHEN SELECTING PARKING SPACE | DETERMINING CONDITION |
|---|---|
| PARKING SPACE LOCATED CLOSE TO DOORWAY OF STORE | (DETERMINING CONDITION 1)<br>• AVERAGE VEHICLE SPEED BETWEEN POINT OF ENTERING PARKING LOT AND POINT OF STARTING FIRST TO SLOW DOWN: HIGH<br>• MOVEMENT OF LINE OF SIGHT BETWEEN POINT OF ENTERING PARKING LOT AND POINT OF STARTING FIRST TO SLOW DOWN: SMALL<br>• LINE OF SIGHT FOCUSES ON PARKING SPACE LOCATED CLOSE TO DOORWAY OF STORE IN PREDETERMINED PERIOD FROM POINT OF FIRST STARTING TO SLOW DOWN |
|  | (DETERMINING CONDITION 2)<br>• THERE IS UTTERANCE TO PREFERENCE REGARDING PARKING SPACE BEFORE PARKING IN PARKING SPACE<br>• PARKING POINT IS PARKING SPACE LOCATED CLOSE TO DOORWAY OF STORE |
| PARKING SPACE LOCATED IN SHADY SPOT | (DETERMINING CONDITION 3)<br>• AVERAGE VEHICLE SPEED BETWEEN POINT OF ENTERING PARKING LOT AND POINT OF STARTING FIRST TO SLOW DOWN: HIGH<br>• MOVEMENT OF LINE OF SIGHT BETWEEN POINT OF ENTERING PARKING LOT AND POINT OF STARTING FIRST TO SLOW DOWN: SMALL<br>• LINE OF SIGHT FOCUSES ON PARKING SPACE LOCATED IN SHADY SPOT IN PREDETERMINED PERIOD FROM POINT OF FIRST STARTING TO SLOW DOWN |
|  | (DETERMINING CONDITION 4)<br>• THERE IS UTTERANCE TO PREFERENCE REGARDING PARKING SPACE BEFORE PARKING IN PARKING SPACE<br>• PARKING POINT IS PARKING SPACE LOCATED IN SHADY SPOT |
| EMPTY PARKING SPACE | (DETERMINING CONDITION 5)<br>• MOVEMENT OF LINE OF SIGHT BETWEEN POINT OF ENTERING PARKING LOT AND POINT OF PARKING: LARGE<br>• THERE IS NO OTHER VEHICLE IN RIGHT AND LEFT PARKING SPACES OF PARKING POINT |
| ⋮ | ⋮ |

DETERMINATION DEVICE, DETERMINATION METHOD, AND NON-TRANSITORY COMPUTER READABLE STORAGE MEDIUM STORING DETERMINING PROGRAM

CROSS-REFERENCE TO RELATED APPLICATIONS

This application claims priority to Japanese Patent Application No. 2018-003594 filed on Jan. 12, 2018, which is incorporated herein by reference in its entirety including the specification, drawings and abstract.

BACKGROUND

1. Technical Field

The present disclosure relates to a determination device, a determination method, and a non-transitory computer readable storage medium for storing a determining program that executes the determination method.

2. Description of Related Art

An information processor capable of determining whether or not a parking lot is full based on a change in the speed of a vehicle in the periphery of the parking lot and outputting the determination result to another device is disclosed (for example, Japanese Unexamined Patent Application Publication No. 2015-184820 (JP 2015-184820 A)). In JP 2015-184820, as an example of a method of determining whether or not a parking lot is full, a technique for grasping a change in the speed of the vehicle in the periphery of the parking lot by using probe data collected from respective vehicles, and determining that the parking lot is full when the change in the speed of the vehicle satisfies a predetermined condition (for example, the vehicle transitions from a decelerating state to an accelerating state in front of the parking lot) and the vehicle has passed the parking lot is disclosed.

SUMMARY

If a tendency of a driver to stop his/her vehicle in a parking lot, that is, in what area in the parking lot the driver tends to park his/her vehicle (a tendency of the driver when selecting a parking space) can be grasped, for example, when the vehicle is guided to a parking space in the parking lot by a navigation system or the like, it can be conceivable that the guidance is performed according to the tendency of the driver. For example, when a driver tends to park his/her vehicle in a parking space where both right and left sides are empty for reasons such as anxiety of driving and the like, the navigation system can guide the vehicle to the parking space around which there is no other vehicle parked. However, since the technique disclosed in JP 2015-184820 is just the technique for determining whether the parking lot is full, it cannot grasp the tendency of the driver when the driver selects the parking space.

The present disclosure provides a technique capable of determining a tendency of a driver when the driver selects a parking space.

A first aspect of the disclosure relates to a determination device that determines a tendency of a driver who selects a parking space. The determination device includes an acquisition unit configured to acquire information regarding an attribute of a parking space in a parking lot, information regarding behavior of a vehicle driven by the driver in the parking lot, and information regarding behavior of the driver when the driver is driving the vehicle in the parking lot and a determination unit configured to determine the tendency of the driver when the driver selects the parking space based on the information regarding the attribute of the parking space and at least one of the information regarding the behavior of the vehicle or the information regarding the behavior of the driver.

In the determination device according to the first aspect, the information regarding the attribute of the parking space may include at least one of information indicating a feature related to a structure of the parking space or information regarding a parking situation of another vehicle in the parking space.

In the determination device according to the first aspect, the information regarding the behavior of the vehicle may include at least information regarding a vehicle speed of the vehicle, and the determination unit may be configured to determine the tendency of the driver when the driver selects the parking space based on at least the information regarding the vehicle speed of the vehicle driven by the driver.

In the determination device according to the first aspect, the information regarding the behavior of the driver may include at least information regarding movement of a line of sight of the driver, and the determination unit may be configured to determine the tendency of the driver when the driver selects the parking space, based on at least the information regarding the movement of the line of sight of the driver.

In the determination device according to the first aspect, the information regarding the behavior of the driver may include at least information regarding utterances given by the driver during driving in the parking lot, and the determination unit may be configured to determine the tendency of the driver when the driver selects the parking space, based on at least the information regarding the utterances given by the driver during driving in the parking lot.

A second aspect of the disclosure relates to a method of determining a tendency of a driver who selects a parking space. The method includes acquiring information regarding an attribute of a parking space in a parking lot, information regarding behavior of a vehicle driven by the driver in the parking lot, and information regarding behavior of the driver when the driver is driving the vehicle in the parking lot; and determining the tendency of the driver when the driver selects the parking space, based on the information regarding the attribute of the parking space and at least one of the information regarding the behavior of the vehicle or the information regarding the behavior of the driver.

A third aspect of the disclosure relates to a non-transitory computer readable storage medium for storing a program that executes a method of determining a tendency of a driver who selects a parking space. The method includes acquiring information regarding an attribute of a parking space in a parking lot, information regarding behavior of a vehicle driven by the driver in the parking lot, and information regarding behavior of the driver when the driver is driving the vehicle in the parking lot; and determining the tendency of the driver when the driver selects the parking space, based on the information regarding the attribute of the parking space and at least one of the information regarding the behavior of the vehicle or the information regarding the behavior of the driver.

According to the aspects described above, it is possible to provide a technique capable of determining a tendency of a driver when the driver selects a parking space.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 6 is a table showing an example of determining conditions for determining the tendency of the driver when the driver selects a parking space.

DETAILED DESCRIPTION OF EMBODIMENTS

With reference to accompanying drawings, embodiments will be described. Throughout the drawings, those denoted by the same reference numeral have the same or similar configuration.

System Configuration

Figure 1:
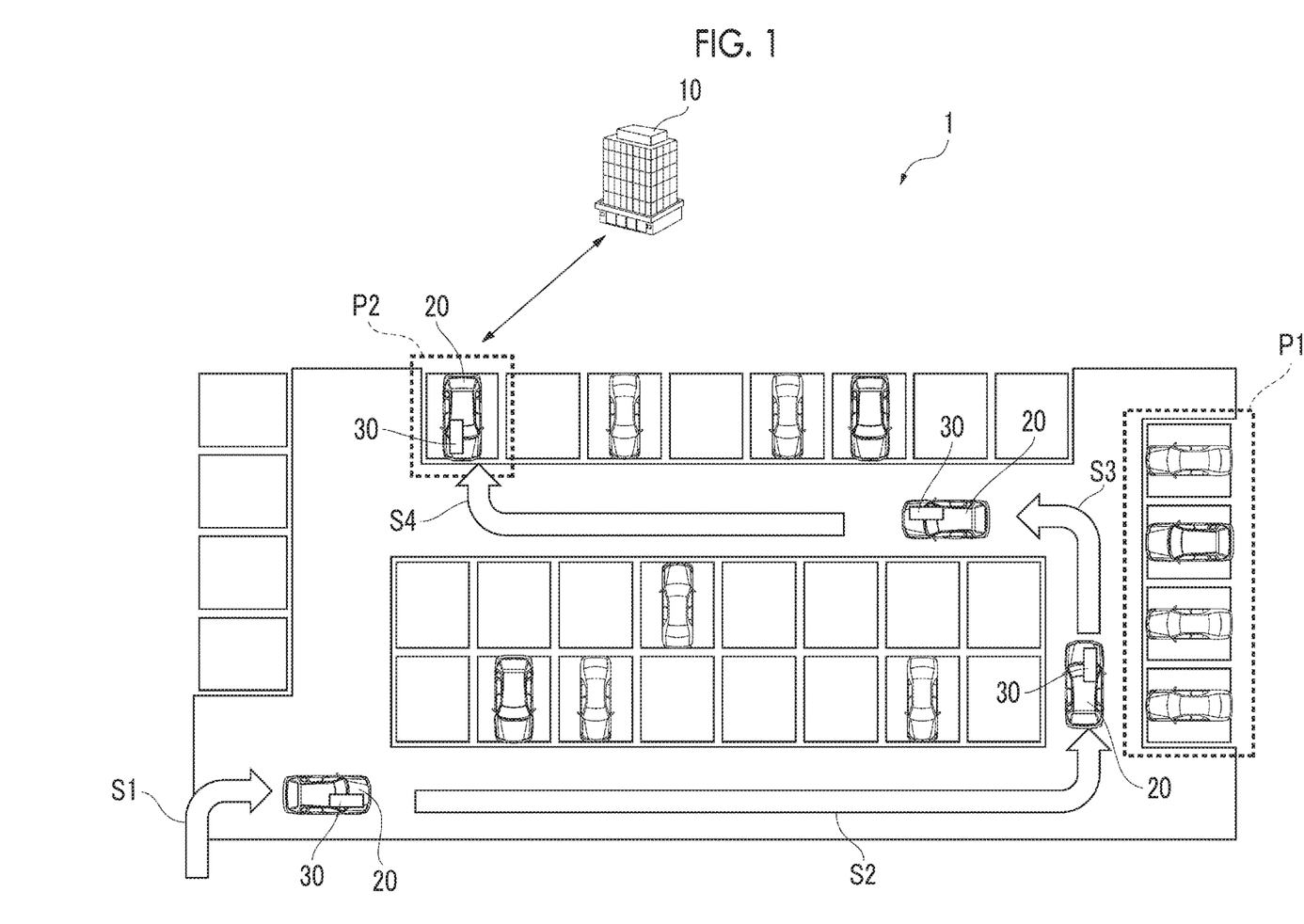
FIG. 1 is a view illustrating an example of a determination system according to a present embodiment.

FIG. 1 is a view illustrating an example of a determination system 1 according to a present embodiment. As illustrated in FIG. 1, the determination system 1 includes a server 10 and vehicles 20. Although the determination system 1 is assumed to include a plurality of vehicles 20, there may be one vehicle 20 in the determination system.

The server 10 determines a tendency (preference) when a driver selects a parking space in a parking lot using information regarding behavior of the driver and information regarding behavior of the vehicle 20 collected from the vehicle 20, and information regarding an attribute of the parking space in the parking lot.

The information regarding the behavior of the vehicle 20 includes at least information indicating the vehicle speed, the traveling location, or the like of the vehicle 20, and time information (time stamp). The server 10 that has received the information regarding the behavior of the vehicle 20 can grasp behaviors made by the vehicle 20 in the parking lot in chronological order.

The information regarding the behavior of the driver includes information indicating the motion of the driver and time information (time stamp). The server 10 that has received the information regarding the behavior of the driver can grasp behaviors made by the driver who is driving the vehicle 20 in the parking lot in a time series. Examples of the motion of the driver include a line of sight of the driver while driving (including the position of the line of sight, the direction of the line of sight, the movement of the line of sight, and the change of the line of sight), utterances given by the driver while driving, or the like.

The information indicating the attribute of the parking space is information indicating what attribute each parking space in the parking lot has. Examples of the attribute of the parking space include a feature related to a structure of the parking space such as whether or not the parking space is located close to the doorway of a store, whether or not the parking space is located close to the gateway of the parking lot, whether or not the parking space has a roof, whether or not the parking space is located in a shady spot, whether or not the parking space is located at the edge spot of the parking lot, whether or not the parking space is specialized for a specific application (for example, for the disabled, for electric charging, or the like), and a parking situation of other vehicles in the parking space such as whether or not another vehicle is parked on the right or left or around the parking space in which the vehicle 20 is parked. The parking space may be the space for just one vehicle 20, or may be a space large enough to park the vehicles 20.

The vehicle 20 may be any vehicle that can be parked at least in the parking lot, but in the present embodiment, a case where the vehicle 20 is a car will be described as an example. However, the present embodiment is not limited thereto, and can be applied to any vehicle 20, such as a motorcycle, if the vehicle can be parked in the parking lot. The vehicle 20 includes a sensor for detecting the behavior of the vehicle 20, a sensor for detecting the behavior of the driver, a sensor (camera) for detecting an attribute of the parking space (particularly, whether or not another vehicle is parked in the parking space), and an on-vehicle device 30 connected to the sensors. The on-vehicle device 30 transmits information regarding the behavior of the vehicle 20, information regarding the behavior of the driver and information regarding the attribute of the parking space, which are detected by the sensors, to the server 10.

The information regarding the attribute of the parking space is not necessarily transmitted from the vehicle 20 to the server 10. Specifically, instead of being transmitted from the vehicle 20 to the server 10 (or in addition to being transmitted from the vehicle 20 to the server 10), the information regarding the attribute may be generated by a manager of the parking lot or the like, and stored in a storage device (such as database) in the server 10. For example, information that basically does not change, for example, information indicating a parking space close to the doorway of a store or information indicating whether or not the parking space has a roof, may be stored in advance in the server 10. The information regarding the attribute of the parking space (for example, information indicating the presence or absence of a parked vehicle for each parking space) may be notified to the server 10 from an information processor for managing the parking lot, or the like and be stored on the storage device (such as database) in the server 10.

Examples of the sensor for detecting the behavior of the vehicle 20 includes a vehicle speed sensor, a steering sensor, a position sensor, an acceleration sensor, a gyro sensor, and a sensor for detecting a direction indicator operation. As the sensor for detecting the behavior of the driver, a camera (which may be a drive recorder) capable of imaging the driver, a line of sight detection sensor, a microphone and the like can be exemplified. Examples of the sensor for detecting the attribute of the parking space include a camera (which may be a drive recorder) for imaging the outside of the vehicle and a radar sensor.

Operation Overview

Next, an operation overview of the determination system 1 determining the tendency of the driver when the driver selects the parking space in the parking lot will be described. In the parking lot shown in FIG. 1, it is assumed that the parking space P1 is the parking space located close to the doorway of the store and the parking space P2 is the parking space around which there is no other vehicle parked. It is also assumed that the information regarding the attribute of the parking space (information indicating that the parking space P1 is the parking space located close to the doorway of the store and the parking space P2 is the parking space around which there is no other vehicle parked) is stored in advance in the storage device of the server 10. The on-vehicle device 30 transmits, to the server 10, the behavior of the vehicle 20 in the parking lot (in this "Operation Overview" section, at least including the position and speed of the vehicle 20) and the behavior of the driver (in the "Operation Overview" section, at least including the line of sight of the driver).

Here, examples of the behavior of the vehicle 20 and the behavior of the driver between the point where the vehicle 20 enters the parking lot and the point where the vehicle 20 is parked in the parking space will be also described with reference to FIG. 1. First, when the driver enters the parking lot (S1), the driver drives the vehicle 20 to the parking space P1 at a relatively high vehicle speed (for example, 10 km/h or more) so as to stop the vehicle 20 in the parking space P1 close to the doorway of the store (S2). In this case, the driver drives while looking forward, and movement of the line of sight of the driver is relatively small. Upon arrival at the parking space P1, the driver slows down (for example, 3 to 4 km/h) while directing the line of sight toward the parking space P1 so as to search for an empty area in the parking space P1 (S3). If the driver finds the whole parking space P1 full, the driver drives the vehicle 20 to another parking space (S4). In this case, the driver slightly speeds up the vehicle 20 and drives the vehicle 20 while reciprocating the line of sight to the right and to the left. Finally, the driver stops the vehicle 20 in the parking space P2. The vehicle 20 notifies the server 10 of information indicating the above-described behavior between the point where the vehicle 20 enters the parking lot and the point where the vehicle 20 is parked in the parking space.

When the vehicle 20 and the driver exhibits the above-described behaviors, the server 10 can determine the tendency of the driver when the driver selects the parking space, for example, in the procedure described below. For example, the server 10 determines that the driver has the tendency to park his/her vehicle in the parking space having the predetermined attribute when the vehicle speed between the point when the vehicle 20 enters the parking lot and the point when the vehicle 20 first starts to slow down is equal to greater than a predetermined speed (for example, 7 km/h), the movement of the line of sight of the driver is relatively small between the point where the vehicle 20 enters the parking lot and the point where the vehicle 20 first starts to slow down, and the line of sight of the driver is directed to the parking space having a predetermined attribute during moving slowly (for example, 5 km/h or less). In the example of FIG. 1, the driver drives the vehicle 20 to the parking space P1 at a relatively high speed so as to stop the vehicle 20 in the parking space P1 located close to the doorway of the store, the movement of the line of sight of the driver is relatively small, and the line of sight of the driver during moving slowly is directed to the parking space P1 (parking space having the attribute of being located close to the doorway of the store). From the above, the server 10 determines that the driver has the tendency to select the parking space located close to the doorway of the store.

In the example of FIG. 1, the driver finally stops the vehicle 20 in the parking space P2, not in the parking space P1. Therefore, the server 10 may determine that the driver has the tendency to select the parking space located close to the doorway of the store as the parking space having the highest priority, and when the parking space located close to the doorway of the store is full, the driver has the tendency to select the parking space around which there is no other vehicle parked.

Functional Block Configuration

Server

Figure 2:
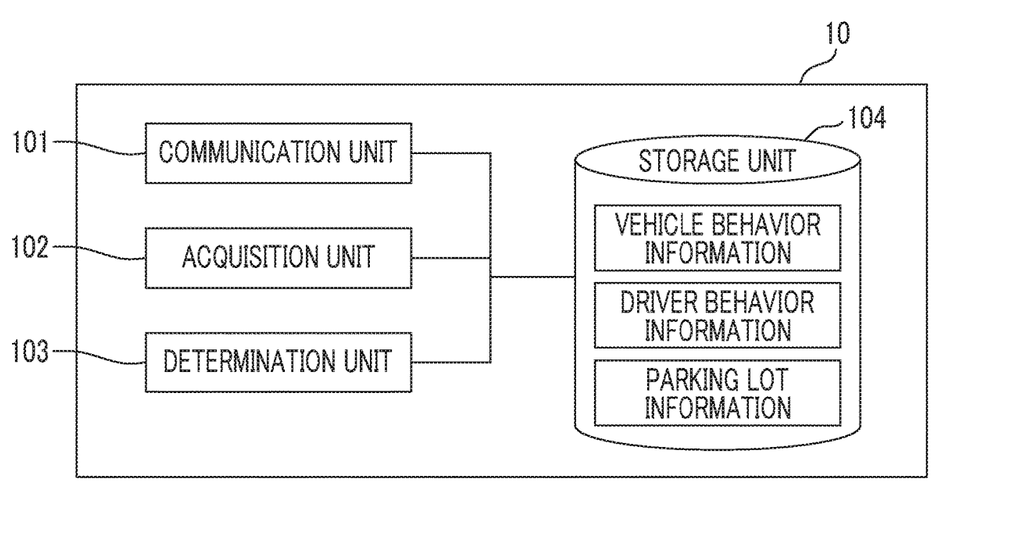
FIG. 2 is a block diagram illustrating an example of a functional block configuration of a server according to the present embodiment.

FIG. 2 is a block diagram illustrating an example of a functional block configuration of the server 10 according to the present embodiment. The server 10 includes a communication unit 101, an acquisition unit 102, a determination unit 103, and a storage unit 104. The communication unit 101, the acquisition unit 102 and the determination unit 103 can be implemented by executing a program (e.g., a determining program) stored in a memory by a central processing unit (CPU) provided in the server 10. The program can be stored in a storage medium. The storage medium storing the program may be a non-transitory computer readable storage medium. The non-transitory storage medium is not particularly limited, but it may be storage medium such as a universal serial bus (USB) memory or a compact disc read only memory (CD-ROM). The storage unit 104 may be implemented using a storage device such as a memory provided in the server 10, a hard disk drive (HDD), or the like. The storage unit 104 stores vehicle behavior information including the information regarding the behavior of the vehicle 20, driver behavior information including the information regarding the behavior of the driver, and parking lot information including the information regarding the attribute of the parking space. In the parking lot information, the information regarding the attribute of the parking space may be included in one parking lot or for each of a plurality of parking lots under management of the server 10.

The communication unit 101 has a function of communicating with each vehicle 20, and receives, from the vehicle 20, the information regarding the behavior of the vehicle 20 and the information regarding the behavior of the driver. The communication unit 101 may further receive the information regarding the attribute of the parking space from the vehicle 20. The communication unit 101 allows the information regarding the behavior of the vehicle 20 and the information regarding the behavior of the driver, which are received from the vehicle 20, to be included in the vehicle behavior information and the driver behavior information, respectively. The communication unit 101 allows the information regarding the attribute of the parking space received from the vehicle 20 to be included in the parking lot information. The communication unit 101 may communicate with an external information processing device, and allow the information regarding the attribute of the parking space received from the information processing device to be included in the parking lot information.

The acquisition unit 102 acquires the information regarding the attribute of the parking space in the parking lot, the information regarding the behavior of the vehicle 20 that the driver is driving in the parking lot, and the information regarding the behavior of the driver when the driver is driving the vehicle 20 in the parking lot, from the parking lot information, the vehicle behavior information and the driver behavior information, which are stored in the storage unit 104, respectively.

The determination unit 103 determines the tendency of the driver when the driver selects the parking space, based on the information regarding the attribute of the parking space, and at least one of the information regarding the behavior of the vehicle 20 or the information regarding the behavior of the driver. For example, the determination unit 103 may determine the tendency of the driver when the driver selects the parking space, based on at least information regarding the vehicle speed of the vehicle 20 as the information regarding the behavior of the vehicle 20. The determination unit 103 may determine the tendency of the driver when the driver selects the parking space, based on at least information regarding the line of sight of the driver as the information regarding the behavior of the driver. The determination unit 103 may determine the tendency of the driver when the driver selects the parking space, based on at least information regarding utterances given by the driver while driving in the parking lot as the information regarding the behavior of the driver.

On-Vehicle Device

Figure 3:
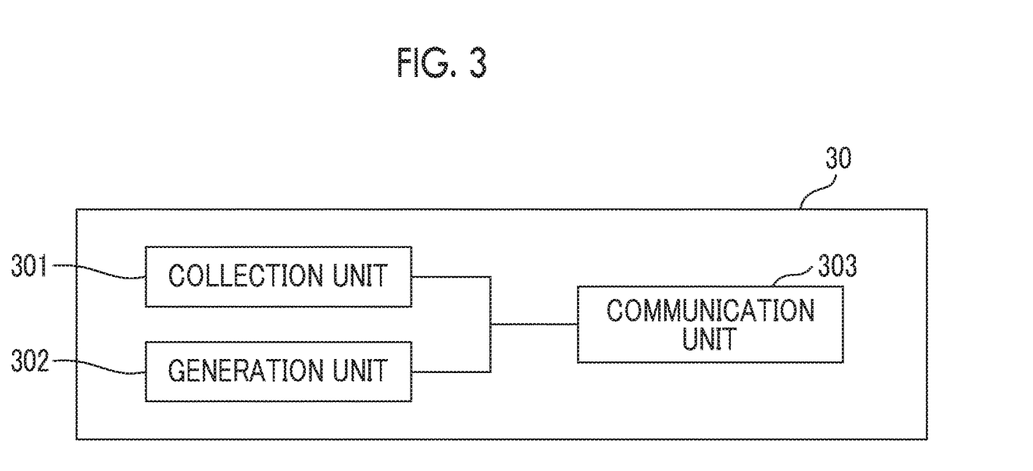
FIG. 3 is a block diagram illustrating an example of a functional block configuration of an on-vehicle device according to the present embodiment.

FIG. 3 is a block diagram illustrating an example of a functional block configuration of the on-vehicle device 30 according to the present embodiment. The on-vehicle device 30 includes a collection unit 301, a generation unit 302, and a communication unit 303. The collection unit 301, the generation unit 302, and the communication unit 303 can be implemented by executing a program stored in a memory by a CPU provided in the on-vehicle device 30. The program can be stored in a storage medium. The storage medium storing the program may be a non-transitory computer readable storage medium. The non-transitory computer readable storage medium is not particularly limited, but it may be a storage medium such as a USB memory or a CD-ROM.

The collection unit 301 collects data measured by various sensors mounted on the vehicle 20. The generation unit 302 analyses and processes the data measured by the sensors and then collected by the collection unit 301 to generate the information regarding the behavior of the vehicle 20, the information regarding the behavior of the driver, and the information regarding the attribute of the parking space, which are to be transmitted to the server 10.

The communication unit 303 transmits, to the server 10, the information regarding the behavior of the vehicle 20, the information regarding the behavior of the driver, and the information regarding the attribute of the parking space, which are generated by the generation unit 302.

Processing Procedure

Figure 4:
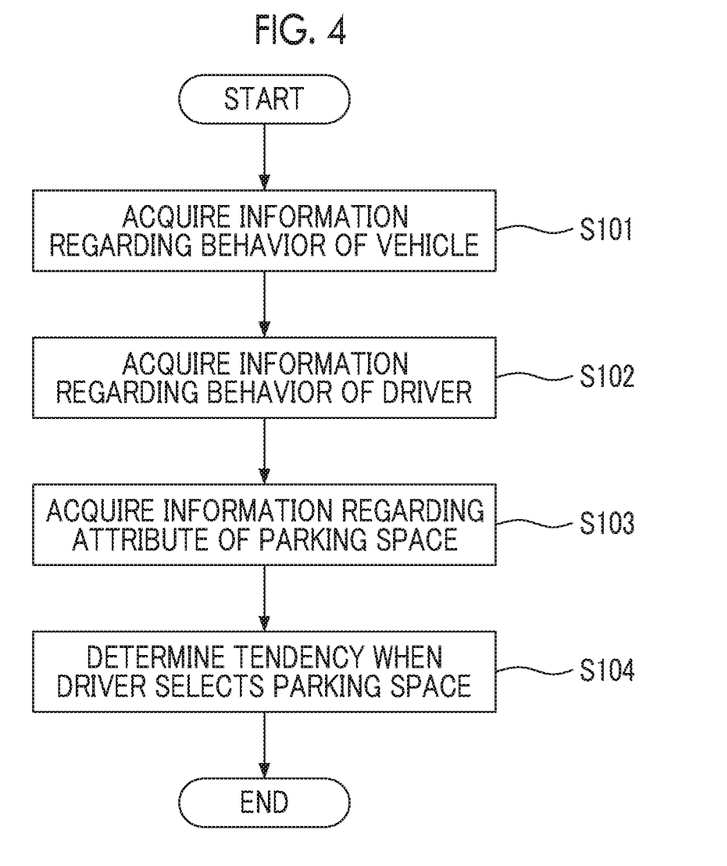
FIG. 4 is a flowchart illustrating an example of a processing procedure for determining tendency of a driver when the driver selects a parking space.

FIG. 4 is a flowchart illustrating an example of a processing procedure for determining the tendency of the driver when the driver selects the parking space. The following processing procedure will be described under the assumption that the driver of a determination object and the parking lot of a determination object have already been determined.

In step S101, the acquisition unit 102 acquires, from the vehicle behavior information stored in the storage unit 104, the information regarding the behavior of the vehicle 20 when the vehicle 20 driven by the driver of the determination object uses the parking lot of the determination object. The acquired information regarding the behavior of the vehicle 20 includes pieces of information indicating the route on which the vehicle 20 has travelled in the parking lot and information indicating the vehicle speed and the time on the route. The server 10 can recognize how the vehicle 20 has travelled in the parking lot by arranging the pieces of information described above in chronological order.

In step S102, the acquisition unit 102 acquires, from the driver information stored in the storage unit 104, the information regarding the behavior of the driver when the driver of the determination object uses the parking lot of the determination object. The acquired information regarding the behavior of the driver includes pieces of information indicating the line of sight of the driver while driving the vehicle 20 in the parking lot, information indicating the utterances given by the driver, and time information. The server 10 can recognize in which direction and at which place the driver has looked as the driver was driving in the parking lot by arranging the pieces of information described above in chronological order.

Figure 5:
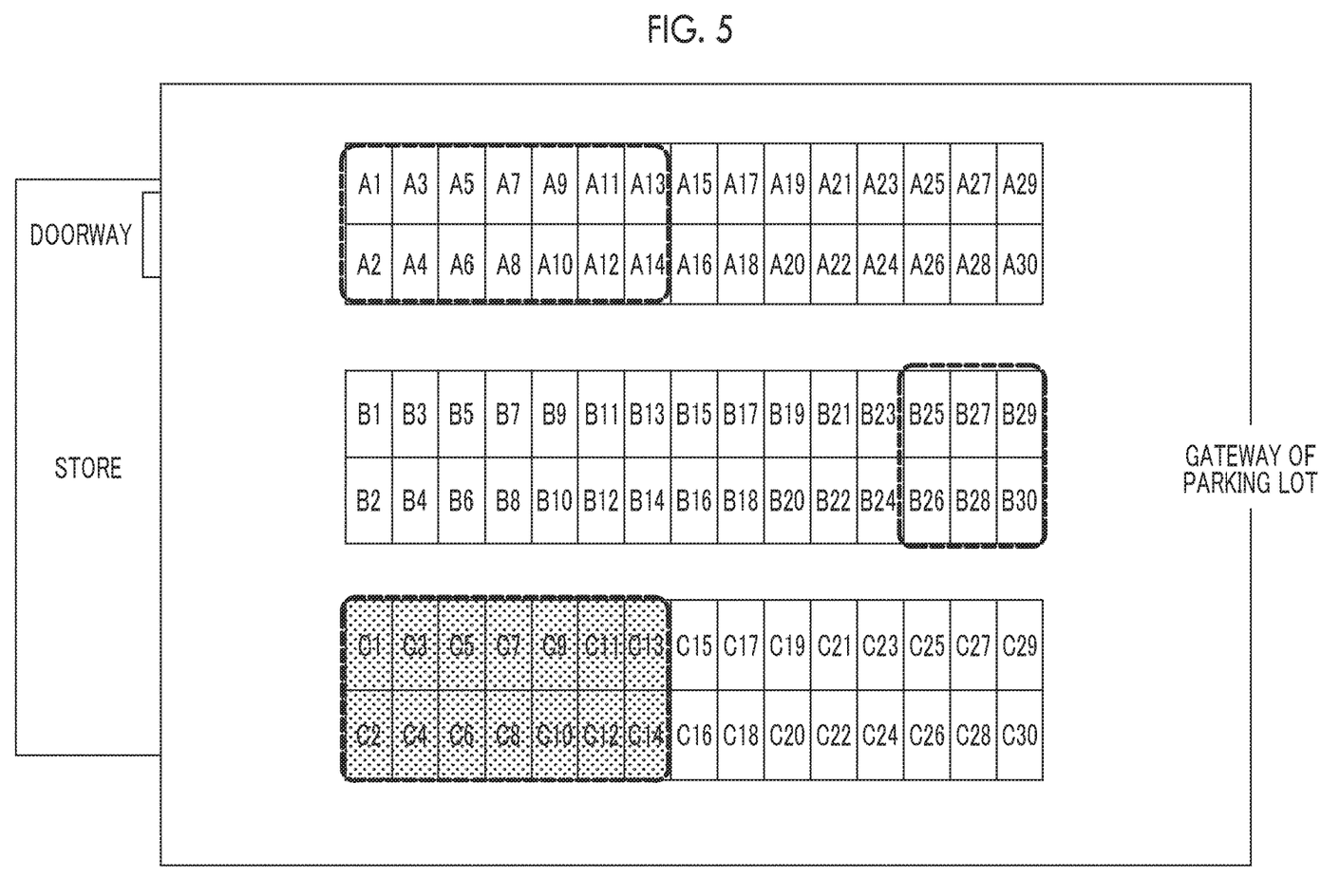
FIG. 5 is a view illustrating information regarding an attribute of the parking space.

In step S103, the acquisition unit 102 acquires, from the parking lot information stored in the storage unit 104, the information regarding the attribute of the parking space in the parking lot of the determination object. Here, a specific example of the information regarding the attribute of the parking space will be described with reference to FIG. 5. In the parking lot illustrated in FIG. 5, parking spaces A1 to A30, parking spaces B1 to B30, and parking spaces C1 to C30 exist. Among the aforementioned parking spaces, it is assumed that the parking spaces A1 to A14 are parking spaces located close to the doorway of the store, the parking spaces C1 to C14 are the parking spaces that have the roof, and the parking spaces B25 to B30 are the parking spaces located close to the gateway of the parking lot. In this case, the information regarding the attribute of the parking space in the parking lot in FIG. 5 includes information indicating the parking spaces A1 to A14 are parking spaces located close to the doorway of the store, the parking spaces C1 to C14 are parking spaces that have the roof, and the parking spaces B25 to B30 are parking spaces located close to the gateway of the parking lot. In addition, determination of which parking space has what kind of attribute (such as ranges of parking spaces located close to the doorway of the store and the gateway of the parking lot) may be made by the manager of the parking lot, and the result of the determination may be included in the parking lot information.

In step S104, the determination unit 103 determines the tendency of the driver when the driver selects the parking space, using the information regarding the behavior of the vehicle 20, the information regarding the behavior of the driver, and the information regarding the attribute of the parking space, which are acquired in steps S101 to S103. In addition, the determination unit 103 determines the tendency of the driver when the driver selects the parking space, using just any one of the information regarding the behavior of the vehicle 20 and the information regarding the behavior of the driver, instead of using both of them.

Specific Example of Method of Determining

FIG. 6 is a table showing an example of determining conditions for determining the tendency of the driver when the driver selects a parking space. A specific example that the determination unit 103 determines the tendency of the driver when the driver selects the parking space will be described with reference to FIG. 6.

As shown in FIG. 6, the determination unit 103 may determine the tendency of the driver when the driver selects the parking space, by storing in advance the determining conditions for determining the tendency for the driver to select the parking space and determining, among the determining conditions, which determining condition meets the acquired behaviors of the vehicle 20 and the driver, and the attribute of the parking space. For example, in the example of FIG. 6, when the determination unit 103 determines that determining condition 1 or determining condition 2 is met, the determination unit 103 determines that the driver has the tendency to select the parking space located close to the doorway of the store. When the determination unit 103 determines that determining condition 3 or determining condition 4 is met, the determination unit 103 determines that the driver has the tendency to select the parking space in a shady spot. When the determination unit 103 determines that determining condition 5 is met, the determination unit 103 determines that the driver has the tendency to select the parking space around which there is no other vehicle parked. Hereinafter, each determining condition will be described in detail below.

Determining Condition 1

When the average vehicle speed between the point where the vehicle 20 enters the parking lot and the point where the vehicle 20 first starts to slow down is relatively high, movement of the line of sight of the driver is relatively small until the vehicle 20 first starts to slow down in the parking lot, and the line of sight of the driver is directed to the parking space located close to the doorway of the store in a predetermined period from the point where the vehicle 20 first starts to slow down, the determination unit 103 determines that the driver has the tendency to select the parking space located close to the doorway of the store.

The determination unit 103 may calculate the average vehicle speed between the point where the vehicle 20 enters the parking lot and the point where the vehicle 20 first starts to slow down by using information indicating the vehicle speed and the position of the vehicle 20, and determine that the average vehicle speed between the point where the vehicle 20 enters the parking lot and the point where the vehicle 20 first starts to slow down is high when the calculated average vehicle speed is equal to or greater than a predetermined threshold. The determination unit 103 may consider the point where the vehicle speed of the vehicle 20 entering the parking lot is first reduced to or below a predetermined threshold as the point where the vehicle 20 first starts to slow down.

When the direction of the line of sight of the driver between the point where the vehicle 20 enters the parking lot and the point where the vehicle 20 first starts to slow down is within a predetermined range of angle, the determination unit 103 may determine that the movement of the line of sight of the driver until the vehicle 20 first starts to slow down in the parking lot is relatively small.

The determination unit 103 may identify the parking space existing in the direction of the line of sight of the driver in a predetermined period (for example, ten seconds) from the point where the vehicle 20 first starts to slow down, by collating the position of the vehicle 20 in the predetermined period and the direction of the line of sight of the driver in the predetermined period with map information indicating the position of each parking space existing in the parking lot. The determination unit 103 may acquire the attribute of the identified parking space from the parking lot information, and determine that the line of sight of the driver is directed to the parking space located close to the doorway of the store when the acquired attribute of the parking space is one of the parking space located close to the doorway of the store.

Determining Condition 2

When the driver gives utterance to preference regarding the parking space before the driver parks the vehicle 20 in the parking space and the parking space in which the vehicle 20 is parked is the parking space located close to the doorway of the store, the determination unit 103 determines that the driver has the tendency to select the parking space located close to the doorway of the store.

When the utterance to the preference regarding the parking space exists among the utterances given by the driver between the time when the driver parks the vehicle 20 in the parking space and the time before a predetermined period (for example, 30 seconds ago), the determination unit 103 may determine that the driver has given utterance to the preference regarding the parking space before the driver parks the vehicle in the parking space. Examples of the utterance to the preference regarding the parking space include "it is good to be empty," "this is better", "lucky" or the like.

Determining Condition 3

In determining condition 3, 'the parking space located close to the doorway of the store" in determining condition 1 is replaced by 'the parking space located in a shady spot', and thus the description thereof will not be repeated.

Determining Condition 4

In determining condition 4 'the parking space located close to the doorway of the store" in determining condition 2 is replaced by 'the parking space located in a shady spot', and thus the description thereof will not be repeated.

Determining Condition 5

When the movement of the line of sight of the driver between the point where the vehicle 20 enters the parking lot and the point where the vehicle 20 is parked is relatively large, and there is no other vehicle parked on the right and left sides of the parking space where the vehicle 20 is parked, the determination unit 103 determines that the driver has the tendency to select an empty parking space (around which there is no other vehicle parked).

When the direction of the line of sight of the driver between the point where the vehicle 20 enters the parking lot and the point where the vehicle 20 first starts to slow down changes over a predetermined range of angle, the determination unit 103 may determine that the movement of the line of sight of the driver between the point where the vehicle 20 enters the parking lot and the point where the vehicle 20 is parked is relatively large.

The generation unit 302 of the on-vehicle device 30 may determine whether or not another vehicle is parked in the right and left parking spaces of the parking space by using an image that is captured by a sensor (camera) mounted in the vehicle 20. The communication unit 303 of the on-vehicle device 30 may transmit, to the server 10, the result of the determining, as the information regarding the attribute of the parking space. Alternatively, the communication unit 303 of the on-vehicle device 30 may transmit, to the server 10, the captured image as the information regarding the attribute of the parking space, and the determination unit 103 of the server 10 may determine whether or not another vehicle is parked on the right and left side of the vehicle 20 by using the received image.

Supplementary Matter

The determining conditions described above are merely examples, and the present embodiment is not intended to be limited to the following determining conditions. For example, in determining condition 1, "the parking space located close to the doorway of a store" can be replaced with "the parking space at the gateway of the parking lot", "the parking space that has a roof", "the parking space for the disabled", "the parking space where a charging station is installed", or the like, which makes the determination unit 103 possible to determine various tendencies when the driver selects the parking space in various ways.

As a modification example of determining condition 1, the determination unit 103 may determine that, when the average vehicle speed between the point where the vehicle 20 enters the parking lot and the point where the vehicle 20 first starts to slow down is relatively fast, and the parking space in which the vehicle 20 is parked is the parking space located close to the doorway of the store, the driver has a tendency to select the parking space located close to the doorway of the store. The same goes for determining condition 3.

Furthermore, in determining condition 1, a condition that the driver utters a preference of the parking space while driving slowly may be added. Examples of the utterance include "the parking space isn't empty" and "nice to be empty".

When a plurality of determining conditions are met, the determination unit 103 may determine which determining condition to follow according to the utterance given by the driver. For example, it is assumed that the driver drives the vehicle 20 to the parking space close to the doorway of the store, but the parking space close to the doorway of the store is full and gave up parking in the parking space close to the doorway of the store, and stops the vehicle 20 in a parking space located in a shady spot. Under the assumption, another assumption is made that the driver uttered "it would be better" when the driver stops the vehicle 20 in the shady parking space. In this case, although both determining condition 1 and determining condition 4 are met, the determination unit 103 may determine that the driver has the tendency to select the shady parking space based on the utterance by the driver, "it (the shady parking space) would be better".

Modification Example of Embodiment

In the present embodiment, the process of determining the tendency of the driver when the driver selects the parking space may be made by an on-vehicle device 30, instead of the server 10. In this case, the acquisition unit 102, the determination unit 103 and the storage unit 104 included in the server 10 may be mounted on the on-vehicle device 30. That is, the server 10 may be referred to as the "determination device", or the on-vehicle device 30 may be referred to as the "determination device".

In the present embodiment, the term "unit" does not merely mean a physical entity, but also means a function of the unit implemented by software. In addition, the function performed by a unit or a device may be implemented by two or more physical entities or devices and the function performed by two or more units or devices may be implemented by one physical entity or device.

What is claimed is:

1. A determination device that determines a tendency of a driver who selects a parking space, the determination device comprising a server configured to:
   store, in advance, a plurality of determining conditions associated with a plurality of parking spaces, wherein each determining condition comprises information regarding an attribute of a parking space, information regarding behavior of a vehicle driven by the driver, and information regarding behavior of the driver when the driver is driving the vehicle;
   acquire information regarding an attribute of a parking space in a parking lot, information regarding behavior of a vehicle driven by the driver in the parking lot, and information regarding behavior of the driver when the driver is driving the vehicle in the parking lot;
   determine which of the determining conditions meets the acquired information;
   determine the tendency of the driver when the driver selects the parking space, based on the determination as to which of the determining conditions meets the acquired information; and
   guide the vehicle to a parking space based on the determined tendency of the driver.

2. The determination device according to claim 1, wherein the information regarding the attribute of the parking space includes at least one of information indicating a feature related to a structure of the parking space or information regarding a parking situation of another vehicle in the parking space.

3. The determination device according to claim 1, wherein:
   the information regarding the behavior of the vehicle includes at least information regarding a vehicle speed of the vehicle; and
   the determination unit server is configured to determine the tendency of the driver when the driver selects the parking space, based on at least the information regarding the vehicle speed of the vehicle driven by the driver.

4. The determination device according to claim 1, wherein:
   the information regarding the behavior of the driver includes at least information regarding movement of a line of sight of the driver; and
   the server is configured to determine the tendency of the driver when the driver selects the parking space, based on at least the information regarding the movement of the line of sight of the driver.

5. The determination device according to claim 1, wherein:
   the information regarding the behavior of the driver includes at least information regarding utterances given by the driver during driving in the parking lot; and
   the server is configured to determine the tendency of the driver when the driver selects the parking space, based on at least the information regarding the utterances given by the driver during driving in the parking lot.

6. A method of determining a tendency of a driver who selects a parking space, the method comprising:
   storing, in advance, a plurality of determining conditions associated with a plurality of parking spaces, wherein each determining condition comprises information regarding an attribute of a parking space, information regarding behavior of a vehicle driven by the driver, and information regarding behavior of the driver when the driver is driving the vehicle;
   acquiring information regarding an attribute of a parking space in a parking lot, information regarding behavior of a vehicle driven by the driver in the parking lot, and information regarding behavior of the driver when the driver is driving the vehicle in the parking lot;
   determining which of the determining conditions meet the acquired information; and
   determining the tendency of the driver when the driver selects the parking space, based on the determination as to which of the determining conditions meets the acquired information; and
   guiding the vehicle to a parking space based on the determined tendency of the driver.

7. A non-transitory computer readable storage medium for storing a determining program that executes a method of determining a tendency of a driver who selects a parking space, the method comprising:
   storing, in advance, a plurality of determining conditions associated with a plurality of parking spaces, wherein each determining condition comprises information regarding an attribute of a parking space, information regarding behavior of a vehicle driven by the driver, and information regarding behavior of the driver when the driver is driving the vehicle;
   acquiring information regarding an attribute of a parking space in a parking lot, information regarding behavior of a vehicle driven by the driver in the parking lot, and information regarding behavior of the driver when the driver is driving the vehicle in the parking lot;

determining which of the determining conditions meet the acquired information; and determining the tendency of the driver when the driver selects the parking space, based on the determination as to which of the determining conditions meets the acquired information; and guiding the vehicle to a parking space based on the determined tendency of the driver.

* * * * *